United States Patent
Barclay et al.

(10) Patent No.: US 7,184,746 B2
(45) Date of Patent: Feb. 27, 2007

(54) METHOD AND APPARATUS FOR PROVIDING NETWORK SUPPORT FOR A WIRELESS EMERGENCY CALL

(75) Inventors: Deborah Lewandowski Barclay, Winfield, IL (US); Terry Jacobson, Deerfield, IL (US); Douglas Harold Rollender, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 44 days.

(21) Appl. No.: 10/889,921

(22) Filed: Jul. 13, 2004

(65) Prior Publication Data

US 2006/0014517 A1    Jan. 19, 2006

(51) Int. Cl.
*H04M 11/04* (2006.01)

(52) U.S. Cl. .................. 455/404.2; 455/404.1; 455/456.1; 455/456.2; 455/456.3; 455/456.4; 455/456.5; 455/456.6

(58) Field of Classification Search ............ 455/404.1, 455/404.2, 456.1, 456.2, 456.3, 456.4, 456.5, 455/456.6
See application file for complete search history.

(56) References Cited

U.S. PATENT DOCUMENTS

| | | | |
|---|---|---|---|
| 6,002,936 A | 12/1999 | Roel-Ng et al. | |
| 6,912,395 B2* | 6/2005 | Benes et al. | 455/456.1 |
| 7,016,478 B2* | 3/2006 | Potorny et al. | 379/49 |
| 2002/0042260 A1 | 4/2002 | Saucedo et al. | |
| 2002/0094822 A1 | 7/2002 | Anctil et al. | |
| 2002/0098844 A1* | 7/2002 | Friedenfelds et al. | 455/445 |
| 2004/0043773 A1* | 3/2004 | Lee et al. | 455/456.1 |
| 2004/0203876 A1* | 10/2004 | Drawert et al. | 455/456.1 |
| 2005/0111630 A1* | 5/2005 | Potorny et al. | 379/45 |

OTHER PUBLICATIONS

Hyun Soo Kim et al: "Performance Analysis of Position Location Methods based on IS-801 Standard", Proceedings of the Institute of Navigation (ION) GPS, (XP002315981), pp. 545-553, Sep. 22, 2000.
M. Drennan: "MPCAP (AGPS) Roaming Support", ESIF-8, Online, (XP002341243), pp. 1-2, Jan. 21, 2004.
TIA/EIA: "Enhanced Wireless 9-1-1 Phase 2 Addendum 1", J-STD-036-A-1, (XP002341244), pp. 1-33 Mar. 2003.
European Search Report, no date listed.
"Joint Standard for Enhanced Wireless 9-1-1, Phase 2," J-STD-036-A (Jun. 2002).

* cited by examiner

*Primary Examiner*—Jean Gelin
*Assistant Examiner*—Olumide Ajibade-Akonai

(57) ABSTRACT

A system is provided to allow a network to obtain the location of a mobile station (e.g. mobile phone) having AGPS/AFLT CDMA capability during an emergency call—without the use of the MPCAP parameter. The MPC invokes the PDE, which is IS-801 AGPS capable, without the MPCAP parameter. The PDE then queries the mobile for its geolocation capabilities, in the absence of the MPCAP parameter. This allows a visited network (e.g. the network in which the mobile station is roaming) to obtain a position (based on IS-801 AGPS/AFLT) for roaming mobile stations that are CDMA AGPS/AFLT capable—without the use of the network MPCAP parameter.

12 Claims, 5 Drawing Sheets

METHOD AND APPARATUS FOR PROVIDING NETWORK SUPPORT FOR A WIRELESS EMERGENCY CALL

BACKGROUND OF THE INVENTION

This invention relates to a method and apparatus for providing network support for CDMA assisted-GPS (or AFLT) during a wireless emergency call. More particularly, the embodiments described herein provide mobile users with CDMA assisted-GPS (or AFLT) in both home and roaming networks.

While the invention is particularly directed to the art of network support for wireless emergency calls, and will be thus described with specific reference thereto, it will be appreciated that the invention may have usefulness in other fields and applications. For example, the teachings of the invention may be adapted for use in other protocol environments and for other calls requiring special treatment by the network.

By way of background, a number of difficulties have arisen relative to wireless emergency calls. As defined in the Joint Standard for "Enhanced Wireless 9-1-1, Phase 2," J-STD-036-A (June 2002), the home location register (HLR) could simply be provisioned with a mobile position capability (MPCAP) parameter. When the mobile station (MS) roams, the MPCAP parameter would be sent to the visitor location register (VLR) in the serving system.

In this regard, with reference to FIG. 1, a call flow under the techniques proposed by the standard would be as follows. The MS invokes an Emergency Services call (line a). The mobile switching center (MSC) then initiates an origination request (ORREQ) providing mobile information and a mobile station identifier (MSID) to the mobile position center (MPC) (line b). The mobile positioning capabilities (MPCAP) parameter obtained from the HLR/VLR is also passed in the ORREQ.

The MPC returns a response immediately, but stores the MSID/mobile information (line c). The MSC consequently routes the call toward the emergency services network entity (ESNE) selected by the emergency services routing digits (ESRD) (line d). The call set-up signaling formats are defined in Appendix D of the afore-noted standard.

The MPC uses the information received in the ORREQ to request the position determining entity (PDE) for initial position of the MS (line e). The PDE receives a position request (GPOSREQ) from the MPC indicating the MS's position capabilities (MPCAP).

The PDE must then obtain/provide positioning information and initiates an SMS (short message service) delivery point-to-point invoke message (SMDPP), encapsulating in the SMS_BearerData parameter an action according to the value of the MPCAP parameter and the procedures defined in IS-801 (line f). As a result, the MSC sends a databurst message to the MS containing the bearer data from the SMDPP message containing the positioning related information (line g). In turn, the MS returns a response containing the position related information (e.g., IS-801) in a databurst message to the MSC (line h).

The MSC sends the MS-provided positioning related information in an smdpp message to the PDE (line i). In this case, the MS initiates the exchange of positioning related information. A databurst message is sent to the MSC containing this information (line j).

The MSC then forwards the information to the PDE in an SMDPP message (line k). The PDE acknowledges the received information in an smdpp message (line l).

The PDE uses the received information to determine the MS's position and sends the response to the MPC using a geoposition request INVOKE message (gposreq) (line m).

The ESME autonomously requests the position of an MS with an emergency services position request invoke (ES-POSREQ) message toward the MPC determined from the incoming trunk group, the known emergency services routing digits (ESRD), or other means (line n). This request is asynchronous and is due to the arrival of the Emergency Services Call at the ESNE.

The MPC caches the position as 'initial position' and returns the position in an esposreq to the ESME (line o).

Notwithstanding the techniques proposed by the standards (e.g. represented by the call flow of FIG. 1), the marketplace has not embraced these notions. In this regard, although this approach is clearly defined in standards, service providers do not use it because it is apparently too cumbersome to provision the MPCAP parameter individually for each subscriber. As such, the Emergency Services Industry Forum (ESIF) has identified a problem in "MPCAP (AGPS) Roaming Support," ESIF-029, Jan. 21, 2004.

More specifically, the problem is that CDMA mobiles with Assisted-GPS and/or Advanced Forward Link Trilateration capabilities (CDMA AGPS/AFLT) (i.e., those utilizing the position determination service standard for dual-mode spread spectrum systems called IS-801) that roam out of their home network may not have their latitude/longitude determined during an E911 Phase 2 emergency call. The reason is that the MobilePositionCapabilities (MPCAP) parameter that identifies the geolocation capabilities of the mobile is not passed from the home to the serving network. As noted above, service providers are not supporting the standards by storing the MPCAP parameter in the HLR and passing it to the VLR.

Instead, the home MobilePositionCenter (MPC) typically uses a mapping table that maps electronic serial number (ESN) ranges to an MPCAP parameter. However, as reported by ESIF, if a mobile roams, there is no way to convey the MPCAP parameter to the serving MPC. Under this condition, the MPC has been defaulting to E911 Phase 1 and only reporting the cell/sector of the mobile. Significantly, the network is not able to use the CDMA AGPS/AFLT capabilities to obtain the mobile's precise location.

Referring to FIG. 2, this common approach generally has a call flow as follows. The MS invokes an emergency services call (line a). The MSC then initiates an ORREQ providing Mobile Information and MSID to the MPC (line b). The MobilePositioningCapabilities (MPCAP) parameter is not available from the HLR/VLR.

The MPC returns a response immediately, but stores the MSID/Mobile Information (line c). The MSC routes the call toward the ESNE selected by the ESRD (line d). The call set-up signaling formats are defined in Annex D of the above-noted standard.

In this scenario, the MPCAP was not received in the ORREQ, so the MPC looks for a MPCAP in its proprietary mapping table which maps the ESN to a MPCAP. The MPC uses the information received in the ORREQ and ESN mapping table to request the PDE for initial position of the MS (line e). The PDE receives a position request (GPOSREQ) from the MPC indicating the MS's position capabilities (MPCAP). Current practices will default to the latitude/longitude of the cell/sector if the MPCAP was not obtained from the ESN table; this is typical for roamers. If there was no MPCAP, lines e through m would not be executed.

The PDE must then obtain/provide positioning information and initiates an SMDPP, encapsulating in the SMS- _BearerData parameter an action according to the value of the MPCAP parameter and the procedures defined in IS-801 (line f). The MSC sends a databurst message to the MS containing the bearer data from the SMDPP containing the positioning related information (line g).

The MS returns a response containing the positioning related information (e.g., IS-801) in a databurst message to the MSC (line h). The MSC sends the MS-provided positioning related information in an smdpp to the PDE (line i).

In this case, the MS initiates the exchange of positioning related information. A databurst message is thus sent to the MSC containing this information (line j).

The MSC forwards the information to the PDE in an SMDPP (line k). The PDE acknowledges the received information in an smdpp (line l).

The PDE uses the received information to determine the MS's position and sends the response to the MPC (gposreq) (line m). The ESME autonomously requests the position of an MS with an ESPOSREQ toward the MPC determined from the incoming trunk group, the known ESRD, or other means (line n). This request is asynchronous and is due to the arrival of the Emergency Services Call at the ESNE. The MPC caches the position as 'initial position' and returns the position in an esposreq to the ESME (line o).

Notably, the call flow of FIG. 2 only applies to action of the mobile station within its home network. As noted above, the ESN mapping tables are not provided outside the home network. Therefore, when a mobile station is roaming, it does not have full emergency call capability, as defined in Enhanced Wireless 9-1-1 Phase 2. It merely has features made available by Enhanced Wireless 9-1-1 Phase 1, namely, cell/sector location information. As a result, determining the precise location of the mobile station that made the call is more difficult, if not impossible.

The present invention contemplates a new and improved technique that resolves the above-referenced difficulties and others.

SUMMARY OF THE INVENTION

A method and apparatus for providing network support for CDMA assisted-GPS or AFLT during a wireless emergency call are provided.

In one aspect of the invention, the method comprises receiving, at a mobile position center, an origination request for an emergency call from a mobile station, determining if a mobile position capability parameter is available for the emergency call, sending a geoposition request to a position determining entity without a mobile position capability parameter if the mobile position capability parameter is not available, the position determining entity receiving a geoposition request without a mobile position capability parameter, the position determining entity, sending a request to the mobile station to determine position capabilities in accord with a selected geographic position determination technique, receiving a response from the mobile station, determining the location of the mobile station according to the selected geographic position determination technique if the response indicates that the mobile station accepted the request, and determining the location of the mobile station according to an alternative geographic position determination technique if the response indicates that the mobile station rejected the request.

In another aspect of the invention, the method further comprises determining the location of the mobile station according to the selected geographic position determination technique if the mobile position capability parameter is available.

In another aspect of the invention, the method comprises receiving at a mobile position center an origination request for an emergency call from a mobile station, sending a geoposition request to a position determining entity, the position determining entity receiving a geoposition request without a mobile position capability parameter, the position determining entity, sending a request to the mobile station to determine position capabilities in accord with a selected geographic position determination technique, receiving a response from the mobile station, determining the location of the mobile station according to the selected geographic position determination technique if the response indicates that the mobile station accepted the request and determining the location of the mobile station according to an alternative geographic position determination technique if the response indicates that the mobile station rejected the request.

In another aspect of the invention, means for implementing the methods according to the present application are provided.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention relates to techniques for a network to obtain the location of a mobile station (e.g. mobile phone) having IS-801 AGPS and/or AFLT CDMA capability during an emergency call—without the use of the MPCAP parameter. Accordingly, this approach does not depend on the network MPCAP parameter.

Instead, the MPC invokes the PDE, which is IS-801 AGPS capable, without the MPCAP parameter. The IS-801 standard has a mechanism that allows the PDE to query the mobile for its geolocation capabilities, irrespective of the presence or absence of the MPCAP parameter. Unlike the prior art, this will allow a visited network (e.g. the network in which the mobile station is roaming) to obtain a position (based on IS-801 AGPS) for roaming mobile stations that are CDMA IS-801 AGPS/AFLT capable—without the use of the network MPCAP parameter.

This approach has other distinctions over that which is known. For example, it could eliminate the need for service providers to provision MPCAP parameters in the HLR or MPC ESN table. In addition, it is more robust than the ESN mapping table in that roaming mobiles can get Enhanced Wireless 9-1-1, Phase 2 (E911 Phase 2) emergency call treatment. As implemented, it is far simpler and cost efficient for service providers. Such service providers may not need to provision HLRs or ESN tables. The described embodiments are also sufficiently flexible to accommodate the presence or absence of the MPCAP parameter.

Figure 3:
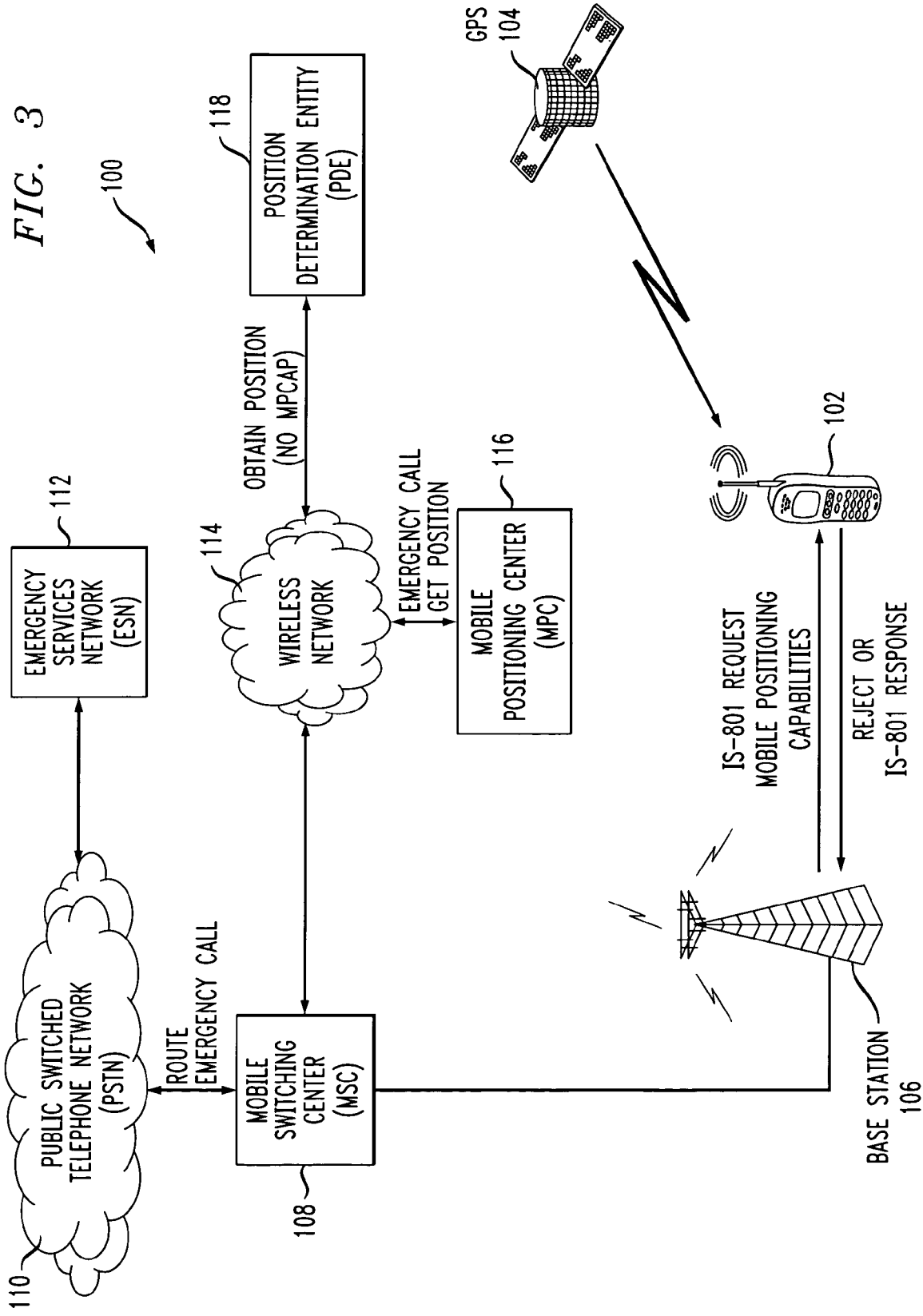
FIG. 3 illustrates a network into which the present invention may be implemented.

Referring now back to the drawings wherein the showings are for purposes of illustrating the preferred embodiments of the invention only and not for purposes of limiting same, FIG. 3 provides a view of a system into which the present invention may be implemented.

As shown, a network 100 communicates with a mobile station 102. The mobile station (MS) 102 is also in communication with an appropriate global positioning system (GPS) system 104. Within the network, a base station (BS) 106 is connected through an air interface to mobile switching center (MSC) 108. The mobile switching center (MSC) 108, likewise, is connected to the public switched telephone network (PSTN) 110, which is in communication with an emergency services network (ESN) 12. Mobile switching center (MSC) 108 also communicates with a wireless network 114 that has available to it a mobile positioning center (MPC) 116 and a position determining entity (PDE) 118.

It should be appreciated that the network 100 is merely exemplary in nature. It may take a variety of forms that will, nonetheless, accommodate the objectives and teachings of the presently described embodiments. In addition, in one form, the control software responsible for implementation of the steps of the invention that will be described hereafter, resides within the mobile positioning center (MPC) 116. It may also reside within the mobile switching center (MSC) 108. It may alternatively be distributed among various network elements including the mobile positioning center (MPC) 116, the mobile switching center (MSC) 108 and/or the position determining entity (PDE) 118.

Moreover, the network elements illustrated take forms known to those skilled in the art, except as provided herein. The overall known functionality of these components need not be described herein. In addition, it should be appreciated that the network elements illustrated may be replaced by alternative elements to perform their functionality, including the functionality of the presently described embodiments. For example, the mobile switching center (MSC) may take the form of a primary switching module having a different configuration based on a different technology, such as the technology of a different generation of telecommunication networks. Likewise, the base station (BS), mobile positioning center (MPC) and the position determining entity (PDE) may take alternative forms, yet still accomplish the objectives of the present invention.

An appropriate system for supporting CDMA IS-801 assisted GPS (AGPS) and/or Advanced Forward Link Trilateration (AFLT) during a wireless emergency call is realized by implementation of the presently described embodiments. Within the network 100, exemplary techniques or methods according to those of FIGS. 4 and 5 are implemented.

Figure 4:
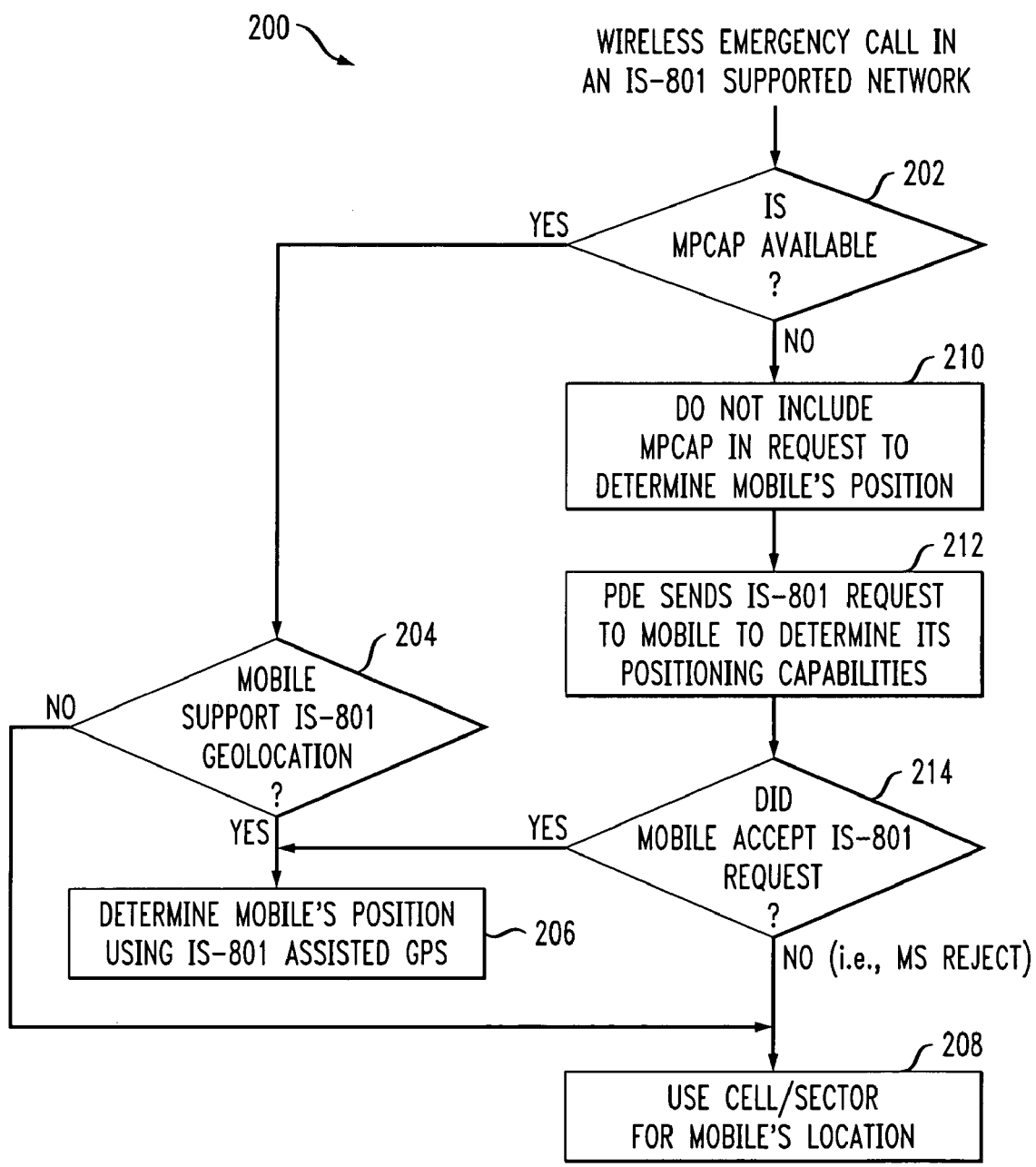
FIG. 4 is a flow chart illustrating a method according to the present invention; and, FIG. 5 illustrates a call flow diagram illustrating an exemplary implementation of the present invention.
Figure 5:
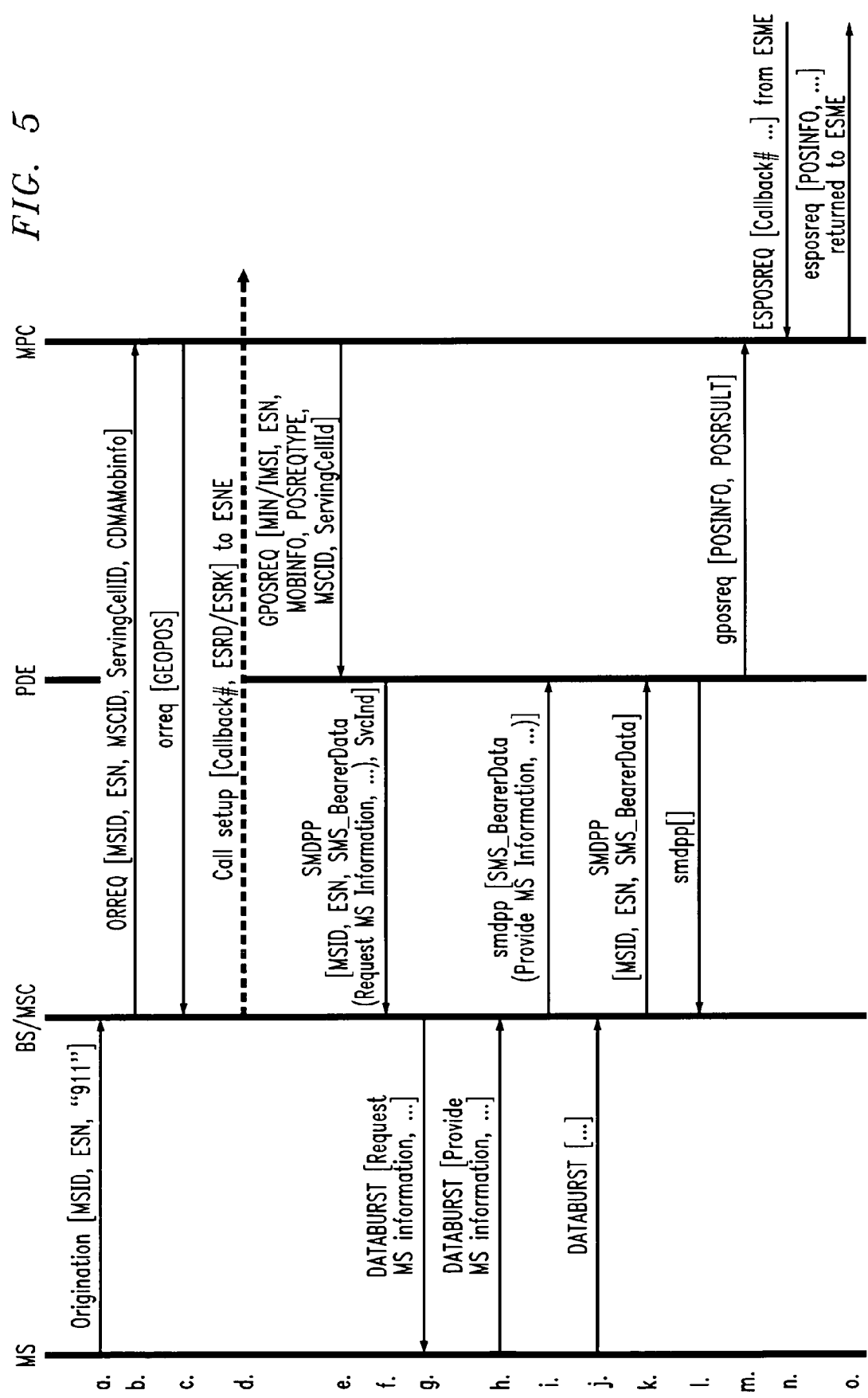

FIG. 4 illustrates a flow chart for an exemplary method 200 that will allow the mobile station (MS) 102, having CDMA IS-801 AGPS/AFLT capabilities, to initiate an emergency call without regard to its location—and utilize its full IS-801 GPS/AFLT capabilities. It will be understood then that the subject call may be made in the home network of the mobile station (MS) 102 or in another network in which the mobile station (MS) 102 is roaming.

The mobile switching center (MSC) 108 detects the emergency call and invokes the serving Mobile Positioning Center (MPC). The MPC does not need to wait for the mobile station position in order to route the emergency call. As such, the MPC can determine the route and return the route information to the MSC. The MSC routes the emergency call (not shown).

Figure 1:
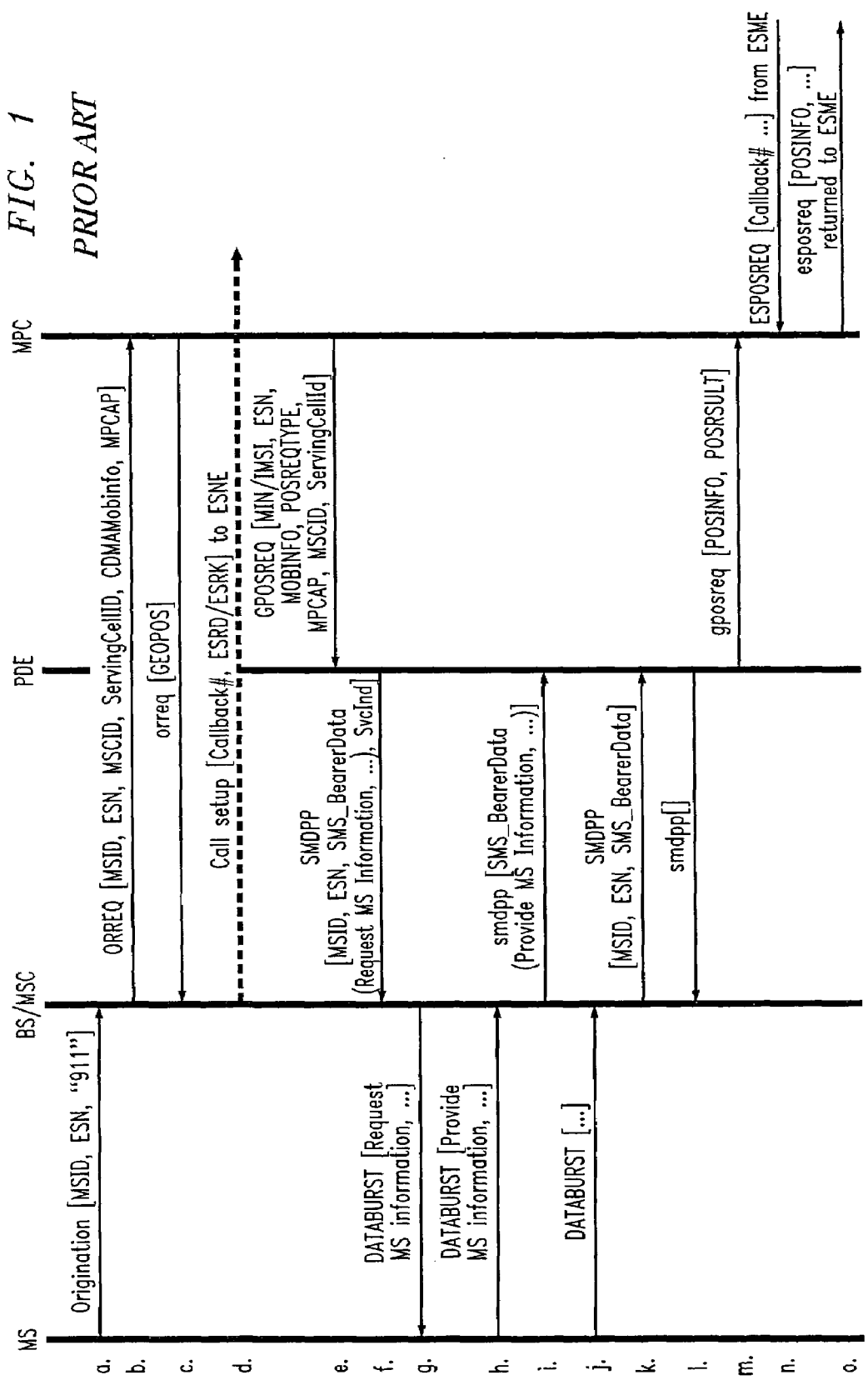
FIG. 1 illustrates a call flow diagram relating to wireless emergency calls according to a standard.
Figure 2:
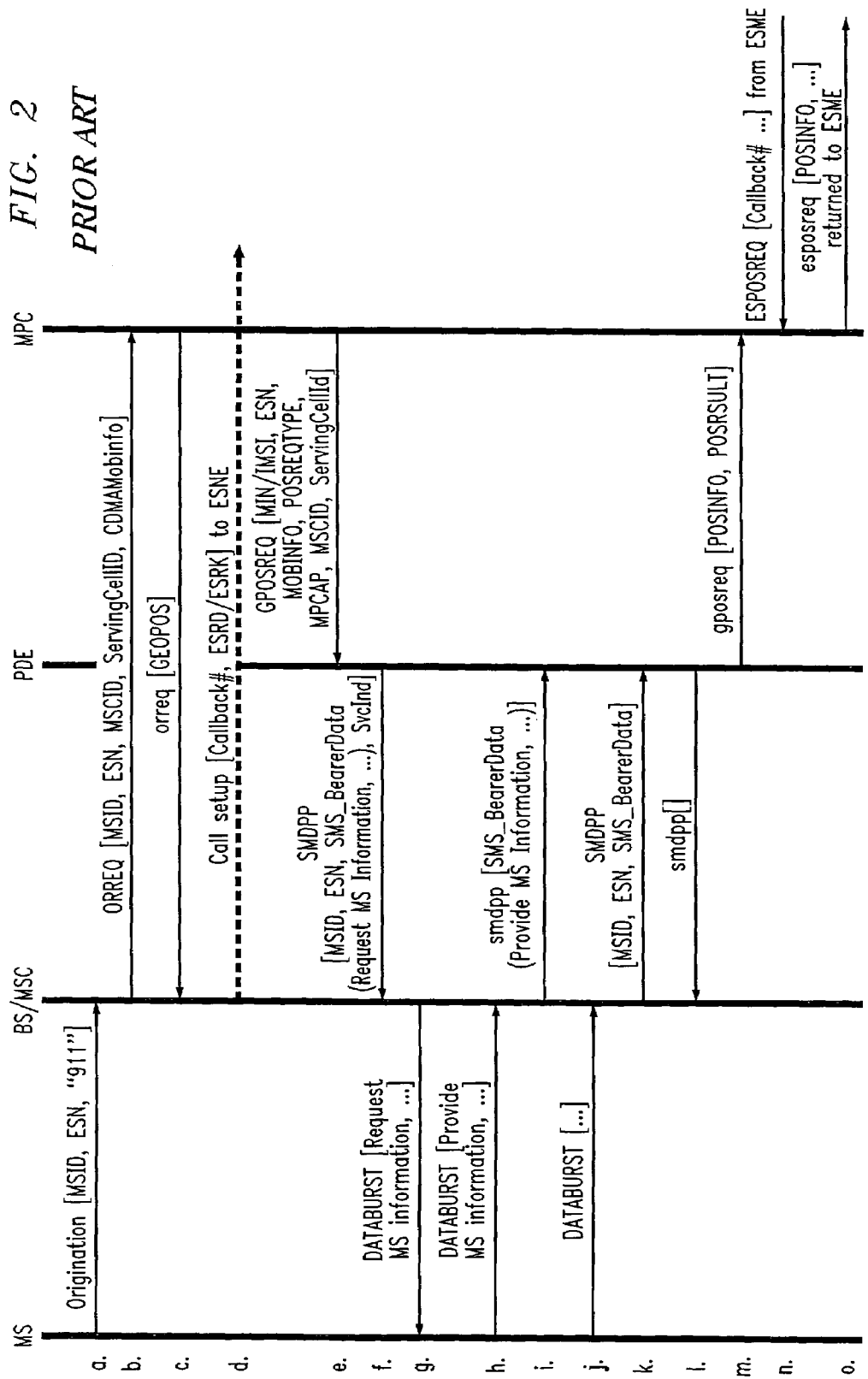
FIG. 2 is a call flow diagram relating to existing approaches to wireless emergency calls.

In parallel, the MPC coordinates the obtaining of the mobile station geographic position. In this regard, it is determined whether the mobile position capability (MPCAP) parameter is available (at 202). It may be available according to the standard (e.g. FIG. 1) (e.g. stored in the home location register (HLR) or visitor location register (VLR)). If so, it is passed to the MPC. If the MPCAP was not received from the MSC, the MPC may have a table that maps the mobile's electronic serial number (ESN) to a mobile positioning capabilities (MPCAP) parameter (e.g. FIG. 2), as is known.

If the MPCAP parameter is available, a determination is then effectively made as to whether the mobile station supports IS-801 geolocation (at 204). If not, only the cell/sector of the mobile station is determined and used for emergency response purposes (at 208). If the mobile station supports IS-801 geolocation, however, the MPC sends a geoposition request to the PDE and the location of the mobile station is determined using the full IS-801 Assisted GPS and/or AFLT capability of the mobile station (at 206).

If there is no MPCAP parameter available for the ESN, as determined (at 202), the MPC invokes the IS-801 Position Determination Entity (PDE) without an MPCAP parameter (at 210).

The PDE receives the request to determine the mobile's position. Of course, the MPCAP parameter was not included. The PDE then attempts a handset based IS-801 AGPS/AFLT session with the mobile (at 214). In the first databurst message (based on, for example, CDMA 2000) to the MS, the PDE requests the geolocation capabilities of the mobile.

A determination is then effectively made as to whether the mobile station (MS) 102 is IS-801 capable so that an appropriate geographic position determination technique may be implemented. If the mobile is not IS-801 capable, it rejects the databurst message. Then, an alternative geographic position determination technique is used. For example, only the cell/sector location information is used for emergency response purposes (at 208). Enhanced Formal Link Trilateration (EFLT) may also be used, for example, as the alternative. It may also merely send a failure message to the MPC.

If the mobile station is IS-801 capable, it reports the type of geolocation capabilities it supports and may also provide some network measurements in its response to the PDE. The PDE continues the geolocation sessions with the mobile until the position is determined (at 206).

Once the PDE obtains the mobile's position, it is returned to the MPC. The MPC stores the mobile's position until requested by the emergency network.

Referring now to FIG. 5, an example call flow diagram is used to further illustrate the features of the presently described embodiments. As shown, the MS invokes an Emergency Services Call (line a). The MSC or BS initiates an origination request (ORREQ) providing Mobile Information and MSID to the MPC (line b). In this scenario, the mobile positioning capabilities (MPCAP) parameter is not available from the HLR/VLR.

The MPC returns a response immediately, but stores the mobile station identifier MSID/Mobile Information (line c). The MSC routes the call toward the emergency services network entity (ESNE) selected by the emergency services routing digits (ESRD) (line d). As above, the call set-up signaling formats are illustrated in Annex D to the above-noted standard (i.e., J-STD-036-A (June 2002)).

Since the MPCAP parameter was not received in the ORREQ in this scenario, the MPC proceeds without an MPCAP parameter. The MPC uses the information received in the ORREQ to request the PDE for initial position of the MS (line e). The PDE receives a position request (GPOSREQ) from the MPC without indication of the MS's position capabilities (MPCAP).

The PDE must then obtain/provide positioning information and initiates an SMS delivery point-to-point invoke message (SMDPP), encapsulating in the SMS_BearerData parameter an action (line f). According to procedures defined in IS-801, the PDE will request the MS's positioning capabilities, without the MPCAP parameter. The PDE may also assume AGPS and/or AFLT positioning capabilities and include other IS-801 request or response types in the encapsulated SMS_BearerData parameter.

The MSC sends a databurst message to the MS containing the bearer data from the SMDPP message containing the positioning related information (line g). The MS returns a response containing the positioning related information (e.g., IS-801) in a databurst message to the MSC (line h). If the MS is not IS-801 capable, the MS sends a cdma2000 reject to the MSC.

The MSC sends the MS-provided positioning related information in an SMS point-to-point return result (smdpp) to the PDE (line i) or a failure indication if a reject was received (if failure, go to line m).

In this case, the MS initiates the exchange of additional positioning related information, such as GPS measurements, that may have been requested in line g (line j). A databurst message is sent to the MSC containing this information. The MSC forwards the information to the PDE in an SMDPP message (line k). The PDE then acknowledges the received information in an smdpp (line l).

The PDE uses the received information to determine the MS's position and sends the response to the MPC (gposreq) (line m). If a failure was received from the MS, the PDE may calculate position based on cell/sector or return a failure indication to the MPC. If a failure was received from the PDE, the MPC can optionally invoke another CDMA PDE type if available or use the lat/long of the cell/sector.

The emergency services message entity (ESME) autonomously requests the position of an MS with an emergency services position request invoke (ESPOSREQ) toward the MPC determined from the incoming trunk group, the known ESRD, or other means (line n). This request is asynchronous and is due to the arrival of the Emergency Services Call at the ESNE. The MPC caches the position as 'initial position' and returns the position in an emergency services position request return result (esposreq) to the ESME (line o).

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method suitable for providing network support for CDMA assisted-GPS and/or AFLT during emergency calls, the method comprising:
   receiving at a mobile position center an origination request for an emergency call from a mobile station;
   determining if a mobile position capability parameter is available for the emergency call;
   if the mobile position capability parameter is not available, an MPC sending a geoposition request to a position determining entity, the geoposition request lacking the mobile position capability parameter;
   receiving the geoposition request lacking the mobile position capability parameter by the position determining entity;
   sending a request to the mobile station to determine-position capabilities in accord with a selected geographic position determination technique;
   receiving a response from the mobile station;
   determining the location of the mobile station according to the selected geographic position determination technique if the response indicates that the mobile station accepted the request; and,
   determining the location of the mobile station according to an alternative geographic position determination technique if the response indicates that the mobile station rejected the request.

2. The method as set forth in claim 1 further comprising determining the location of the mobile station according to the selected geographic position determination technique if the mobile position capability parameter is available.

3. The method as set forth in claim 1 wherein the selected geographic position determination technique is based on a Global Positioning System (GPS).

4. The method as set forth in claim 3 wherein the selected geographic position determination technique is based on an IS-801 protocol.

5. The method as set forth in claim 1 wherein the selected geographic position determination technique is based on Advanced Forward Link Trilateration (AFLT).

6. The method as set forth in claim 1 wherein the alternative geographic position determination technique is based on a cell/sector location of the mobile station.

7. An apparatus suitable for providing network support for CDMA assisted-GPS and/or AFLT during emergency calls, the apparatus comprising:
   means for receiving, at a mobile position center, an origination request for an emergency call from a mobile station;
   means for determining if a mobile position capability parameter is available for the emergency call;
   means for sending a geoposition request to a position determining entity if the mobile position capability parameter is not available, the global positioning request lacking the mobile position capability parameter;
   means for receiving a geoposition request at a PDE without the mobile position capability parameter at the position determining entity;
   means for sending a request to the mobile station to determine position capabilities in accord with a selected geographic position determination technique;
   means for receiving a response from the mobile station;
   means for determining the location of the mobile station according to the selected geographic position determination technique if the response indicates that the mobile station accepted the request; and, means for determining the location of the mobile station according to an alternative geographic position determination technique if the response indicates that the mobile station rejected the request.

8. The apparatus as set forth in claim 7 further comprising means for determining the location of the mobile station according to the selected geographic position determination technique if the mobile position capability parameter is available.

9. The apparatus as set forth in claim 7 wherein the selected geographic position determination technique is based on a Global Positioning System (GPS).

10. The apparatus as set forth in claim 9 wherein the selected geographic position determination technique is based on an IS-801 protocol.

11. The apparatus as set forth in claim 7 wherein the selected geographic position determination technique is based on Advanced Forward Link Trilateration (AFLT).

12. The apparatus as set forth in claim 7 wherein the alternative geographic position determination technique is based on a cell/sector location of the mobile station.

* * * * *